(12) United States Patent
Smith et al.

(10) Patent No.: US 7,437,749 B1
(45) Date of Patent: Oct. 14, 2008

(54) INTERACTIVE SUBSCRIPTION TELEVISION TERMINAL

(75) Inventors: Elizabeth A. Smith, Cumming, GA (US); Lee R. Johnson, Lawrenceville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 624 days.

(21) Appl. No.: 08/990,973

(22) Filed: Dec. 15, 1997

Related U.S. Application Data (60) Division of application No. 08/265,941, filed on Jun. 27, 1994, now Pat. No. 5,754,940, which is a continuation of application No. 07/960,261, filed on Oct. 13, 1992, now Pat. No. 5,355,480, which is a continuation of application No. 07/342,987, filed on Apr. 20, 1989, now abandoned, which is a continuation of application No. 07/289,218, filed on Dec. 23, 1988, now Pat. No. 4,987,486.

(51) Int. Cl.
*G06F 3/00* (2006.01)
*G06F 13/00* (2006.01)
*H04N 5/445* (2006.01)

(52) U.S. Cl. ............................. 725/50; 725/61; 725/78; 725/64; 725/105; 725/131; 725/36; 725/37; 725/38; 725/39; 725/44; 725/68; 725/85; 725/104; 725/134; 725/139; 725/142; 725/151

(58) Field of Classification Search ................ 725/61, 725/78, 64, 105, 131, 36, 37–39, 50, 68, 725/85, 104, 134, 139, 142, 151; 715/806–807
See application file for complete search history.

(56) References Cited

U.S. PATENT DOCUMENTS

| 3,539,999 A | 11/1970 | Houldin et al. | 340/172.5 |
| 3,757,037 A | 9/1973 | Bialek | 178/6.6 |
| 3,819,862 A | 6/1974 | Hedges | 179/2 |

(Continued)

FOREIGN PATENT DOCUMENTS

EP  0 103 438  3/1984

(Continued)

*Primary Examiner*—Jason P Salce (57) ABSTRACT

A system for providing interactive services in a subscription television system includes a system controller for controlling the interactive services, a video signal source for transmitting a video signal and a subscriber terminal for receiving a downstream transaction from the system controller and the video signal. The system controller comprises a memory for storing subscriber terminal address data and transaction data, a processor for generating a downstream transaction including subscriber terminal address data and transaction data, a transmitter for transmitting the downstream transaction, and a receiver for receiving an upstream transaction. The subscriber terminal includes memory for storing the downstream transaction, an on screen display generator for overlaying data in place of or superimposed on the video signal, data input circuitry for generating upstream data, and an upstream transmitter for transmitting the upstream data to the system controller. The downstream transaction may include screen data which defines at least one screen to be overlaid in place of or superimposed on the video signal.

28 Claims, 6 Drawing Sheets

U.S. PATENT DOCUMENTS

| | | | |
|---|---|---|---|
| 3,894,176 A | 7/1975 | Mellon | |
| 3,906,457 A | 9/1975 | Mattedi et al. | 395/216 |
| 3,968,327 A | 7/1976 | Gregg, III | |
| 3,987,397 A * | 10/1976 | Belcher et al. | 725/14 |
| 3,997,718 A * | 12/1976 | Ricketts et al. | 725/114 |
| 4,012,583 A | 3/1977 | Kramer | |
| 4,031,543 A * | 6/1977 | Holz | 725/104 |
| 4,059,850 A | 11/1977 | Van Eck et al. | 395/463 |
| 4,072,825 A | 2/1978 | McLay et al. | |
| 4,142,156 A * | 2/1979 | Freund | 725/144 |
| 4,162,513 A * | 7/1979 | Beyers et al. | 348/570 |
| 4,186,438 A | 1/1980 | Benson et al. | 364/200 |
| 4,253,157 A * | 2/1981 | Kirschner et al. | 707/104.1 |
| 4,264,924 A | 4/1981 | Freeman | 358/86 |
| 4,313,213 A * | 1/1982 | Farina et al. | 348/570 |
| 4,319,277 A | 3/1982 | Nicholson et al. | |
| 4,360,828 A * | 11/1982 | Briggs et al. | 725/114 |
| 4,367,548 A * | 1/1983 | Cotten et al. | 398/71 |
| 4,403,303 A | 9/1983 | Howes et al. | 364/900 |
| 4,413,277 A * | 11/1983 | Murray | 348/86 |
| 4,414,621 A | 11/1983 | Bown et al. | |
| 4,425,579 A | 1/1984 | Merrell | |
| 4,439,784 A * | 3/1984 | Furukawa et al. | 725/25 |
| 4,451,701 A | 5/1984 | Bendig | 179/2 |
| 4,451,895 A | 5/1984 | Sliwkowski | |
| 4,455,570 A | 6/1984 | Saeki et al. | 358/86 |
| 4,486,773 A * | 12/1984 | Okubo | 725/2 |
| 4,486,779 A | 12/1984 | Marti | |
| 4,510,568 A | 4/1985 | Kishi et al. | |
| 4,527,204 A | 7/1985 | Kozakai et al. | |
| 4,536,791 A * | 8/1985 | Campbell et al. | 348/476 |
| 4,538,174 A | 8/1985 | Gargini et al. | |
| 4,556,904 A * | 12/1985 | Monat | 348/465 |
| 4,574,305 A * | 3/1986 | Campbell et al. | 359/112 |
| 4,575,579 A | 3/1986 | Simon et al. | 178/4 |
| 4,586,035 A | 4/1986 | Baker et al. | |
| 4,586,158 A | 4/1986 | Brandle | 364/900 |
| 4,613,946 A | 9/1986 | Forman | 364/518 |
| 4,625,235 A * | 11/1986 | Watson | 348/476 |
| 4,647,974 A * | 3/1987 | Butler et al. | 725/36 |
| 4,686,564 A | 8/1987 | Masuko et al. | 725/1 |
| 4,691,351 A * | 9/1987 | Hayashi et al. | 380/242 |
| 4,700,378 A | 10/1987 | Brown | |
| 4,700,386 A * | 10/1987 | Kohn | 380/242 |
| 4,706,121 A * | 11/1987 | Young | 348/27 |
| 4,710,955 A * | 12/1987 | Kauffman | 380/233 |
| 4,718,107 A | 1/1988 | Hayes | |
| 4,734,764 A * | 3/1988 | Pocock et al. | 725/98 |
| 4,751,578 A * | 6/1988 | Reiter et al. | 348/564 |
| 4,752,876 A * | 6/1988 | Couch et al. | 705/5 |
| 4,758,946 A | 7/1988 | Shar et al. | 364/200 |
| 4,763,191 A * | 8/1988 | Gordon et al. | 725/104 |
| 4,786,967 A | 11/1988 | Smith, III et al. | |
| 4,789,863 A * | 12/1988 | Bush | 340/5.9 |
| 4,791,561 A | 12/1988 | Huber | 364/300 |
| 4,792,848 A * | 12/1988 | Nussrallah et al. | 725/4 |
| 4,792,972 A | 12/1988 | Cook, Jr. | |
| 4,802,022 A * | 1/1989 | Harada | 725/78 |
| 4,807,023 A * | 2/1989 | Bestler et al. | 725/104 |
| 4,809,325 A * | 2/1989 | Hayashi et al. | 380/234 |
| 4,814,972 A | 3/1989 | Winter et al. | |
| 4,829,558 A * | 5/1989 | Welsh | 379/92.04 |
| 4,829,569 A * | 5/1989 | Seth-Smith et al. | 348/473 |
| 4,833,710 A * | 5/1989 | Hirashima | 380/233 |
| 4,852,154 A * | 7/1989 | Lewis et al. | 379/93.12 |
| 4,885,775 A * | 12/1989 | Lucas | 380/234 |
| 4,885,795 A * | 12/1989 | Bunting et al. | 725/78 |
| 4,885,803 A * | 12/1989 | Hermann et al. | 398/112 |
| 4,890,322 A * | 12/1989 | Russell, Jr. | 380/231 |
| 4,893,248 A * | 1/1990 | Pitts et al. | 705/400 |
| 4,918,516 A * | 4/1990 | Freeman | 725/78 |
| 4,920,432 A * | 4/1990 | Eggers et al. | 386/96 |
| 4,928,168 A * | 5/1990 | Iwashita | 725/1 |
| 4,963,994 A | 10/1990 | Levine | 358/335 |
| 4,974,252 A * | 11/1990 | Osborne | 379/92.01 |
| 4,985,697 A * | 1/1991 | Boulton | 715/500.1 |
| 5,001,554 A * | 3/1991 | Johnson et al. | 455/26.1 |
| 5,003,384 A * | 3/1991 | Durden et al. | 725/104 |
| 5,010,499 A * | 4/1991 | Yee | 348/552 |
| 5,019,900 A * | 5/1991 | Clark et al. | 725/5 |
| 5,101,197 A * | 3/1992 | Hix et al. | 345/157 |
| 5,151,782 A * | 9/1992 | Ferraro | 725/66 |
| 5,206,949 A * | 4/1993 | Cochran et al. | 707/4 |
| 5,216,515 A * | 6/1993 | Steele et al. | 386/55 |
| 5,231,665 A * | 7/1993 | Auld et al. | 380/241 |
| 5,317,391 A * | 5/1994 | Banker et al. | 725/139 |
| 5,459,522 A * | 10/1995 | Pint | 348/478 |

FOREIGN PATENT DOCUMENTS

| | | |
|---|---|---|
| EP | 0190837 | 1/1986 |
| GB | 1 536 534 | 12/1978 |
| GB | 2 062 422 A | 5/1981 |
| GB | 2 063 027 A | 5/1981 |

* cited by examiner

| SCREEN NUMBER | PRIORITY | CANNIBAL BIT | TYPE | AUDIO / VIDEO CHANNEL | AUDIO | FEATURE NUMBER | TIMEOUT | KEY TEMPLATE |
|---|---|---|---|---|---|---|---|---|

FIG. 4

| KEY ACTION | GO TO SCREEN |
|---|---|

INTERACTIVE SUBSCRIPTION TELEVISION TERMINAL

CROSS REFERENCE TO RELATED APPLICATIONS

This application is a division of application Ser. No. 08/265,941, filed Jun. 27, 1994, now U.S. Pat. No. 5,754,940; which is a continuation of application Ser. No. 07/960,261, filed Oct. 13, 1992, now U.S. Pat. No. 5,355,480; which is a continuation of application Ser. No. 07/342,987, filed Apr. 20, 1989, now abandoned; which is a continuation of application Ser. No. 07/289,218, filed Dec. 23, 1988, now U.S. Pat. No. 4,987,486, and entitled "Automatic Inter-active Television Terminal Configuration" and is related to U.S. Application Serial Nos.: 07/340,642, entitled "Cable Television Transaction Terminal"; 07/340,731, entitled "Terminal Authorization Method"; 07/340,659, entitled "Terminal Polling Method"; 07/340,967, entitled "Interactive Television Terminal with Programmable Background Audio or Video"; and 07/340,660, entitled "Interactive Room Status/Time Information System", filed concurrently herewith.

TECHNICAL FIELD

This invention relates generally to two-way interactive cable television systems in which entertainment services, information and data signals are provided over cable facilities from a system manager location to a user location, and more particularly to a method and apparatus for controlling the storage of data in local storage at the user location.

BACKGROUND OF THE INVENTION

Two-way interactive cable television systems are known for transmitting entertainment, information and data signals over a cable facility toward a plurality of users. Data may be transmitted and addressed to a particular subscriber over a separate data channel or over a so-called "in-band" data channel. In a downstream direction, addressed control data may represent services authorized to a particular terminal or control commands to that terminal. In an upstream direction from a terminal to the service provider or system manager location, control data may represent selections made by a user in response to a polling request or at the time of user selection.

In a hotel environment, the system manager delivers video signals, e.g., television programming, to user terminals located, for example, in various hotel rooms over cable lines, and the system manager also transmits digital messages to receivers at each room location. Similarly, information and data generated at each room are transmitted upstream to the system manager via the cable.

It is known in the prior art to provide an interactive terminal at a user location including a local processor for controlling access to a host computer located at the system manager location and a local data store connected to the local processor. Such terminals also normally consist of a display for displaying messages to the user or details of the transaction being conducted, and a keyboard or remote key pad comprising a number of keys by which the user can enter data and initiate functions.

Typically, a central data storage is provided at the system manager location for storing a complete data base, and a smaller sub-set of that data base is maintained in the local store at the user terminal. Because faster response times can be achieved if a requested transaction can be completed without the need for repeatedly accessing the central data base, configuration of the local store becomes an important design consideration. Prior methods of local storage management have been based upon last use or recency of use, and systems are also known in which those items in the data base most frequently requested by the user terminals are retained in the local store. These methods have not, however, been entirely satisfactory, and have not uniformly achieved the desired reduction in response time. Accordingly, there is a need for a more efficient technique for choosing data items to be stored in a local storage of an interactive terminal system.

SUMMARY OF THE INVENTION

It is an object of the present invention to provide an improved method of local storage management for an interactive terminal which ensures faster response times and which reduces the need for repeatedly accessing the central data base.

It is another object of the present invention to provide a method of local storage management for an interactive terminal which updates the local store in accordance with the relative priority of data entries.

It is still another object of the present invention to provide a method of local storage management which updates the local store in accordance with the system service requested by the user.

An interactive terminal, according to the present invention, comprises a processor, a local data store connected to the processor, a character generator responsive to processor control for generating a television signal output to an associated television receiver, a key pad or remote control for inputting information to the processor, and a power supply input.

In a hotel environment, the interactive terminals are located in individual hotel rooms and are coupled, via 2-way RF communications, to a central hotel location, designated as the system manager, where the terminals are accessed by polling for monitoring and servicing the guests' requests. The local storage capacity of the interactive terminal is provided for storing data and a number of character screen commands, accessed from a central data base at the system manager, for use in generating prompting screens displayed on the television receiver. Thus, in use, a hotel guest may call for a variety of services, e.g., pay TV programs, room service and the like, by operating the input keys of the key pad to cause a prompting screen to be displayed on the television receiver.

According to the invention, character screen commands are stored at the terminal according to an assigned priority. The stored screen commands also include pointers which are used by the terminal processor to prefetch other screens which follow the current screen in a decision tree structure manner. These screens are downloaded from the system manager for storage at the terminal so that they are available for display if and when called for. In operation, if a particular branch of a decision tree is not selected by the user, screens associated with that branch are deleted from terminal memory as needed to make room for new screens. The terminal memory is also controlled so that character screen commands are swapped in and out of memory based on their relative priority.

DETAILED DESCRIPTION OF THE PREFERRED EMBODIMENT

Figure 1:
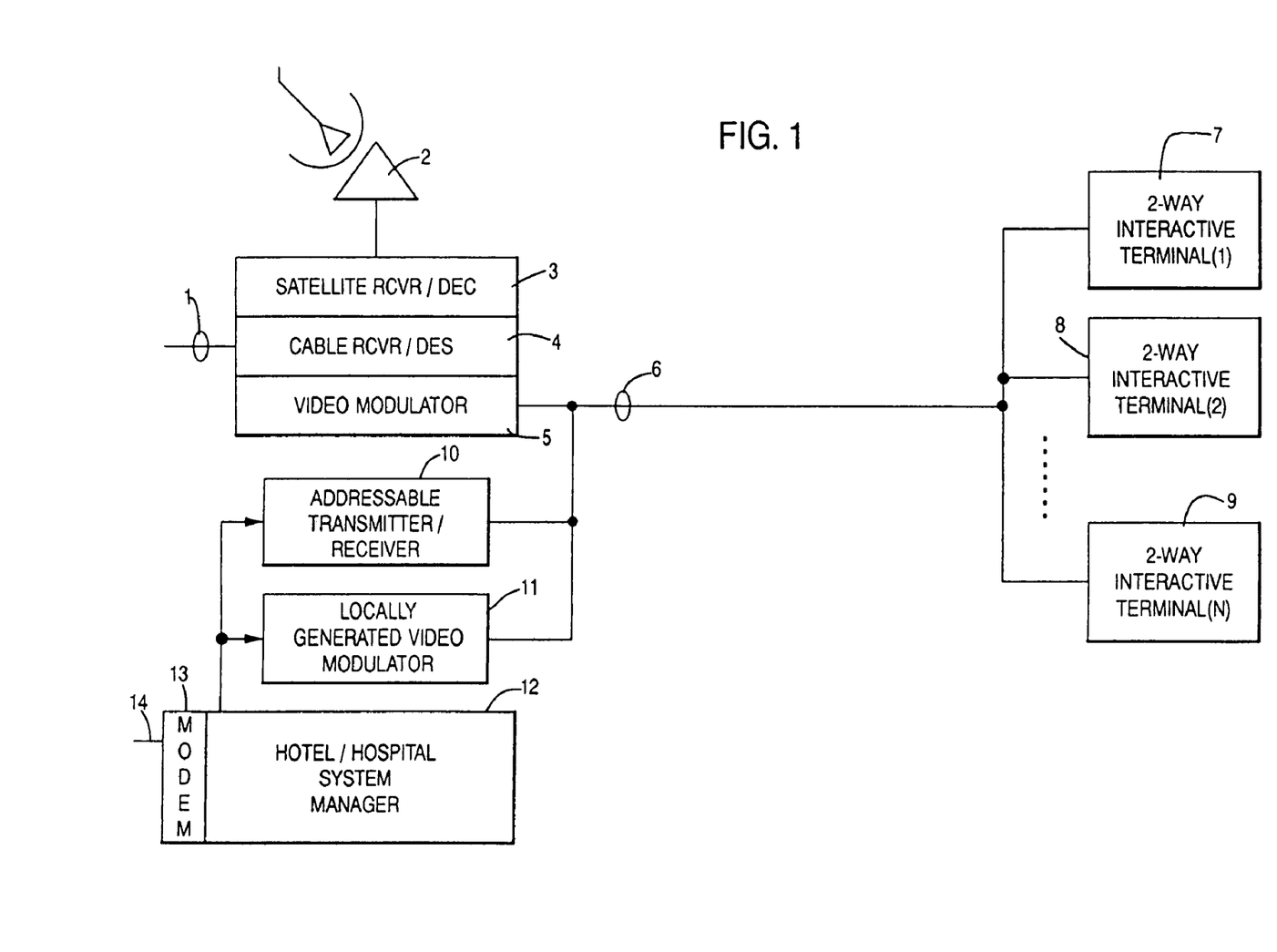
FIG. 1 is a block schematic diagram of an interactive entertainment system in accordance with the present invention applied in a hotel or hospital system environment comprising automatically configurable two-way interactive terminals.

Referring to FIG. 1, there is shown a block schematic diagram of an interactive entertainment system in accordance with the present invention. The depicted embodiment relates to its application in a hotel or hospital system environment, however, the present invention is not so limited, and may be applied in any two-way interactive entertainment system such as a cable or satellite television entertainment system involving a distribution network comprising trunk lines and feeder cables of optical or coaxial cable. For example, satellite receiver and decoder 3, cable receiver and descrambler 4, video modulator 5, addressable transmitter receiver 10, locally generated video modulator 11, and system manager 12 may all be located at the location of a cable television system head end. In this example, coaxial cable or optical fiber link 6 can connect the cable television head end to two-way interactive terminals 7, 8 or 9 of the entertainment system located at individual subscriber premises.

On the other hand, the embodiment of FIG. 1 is especially exemplary of the application of the present invention in a hotel or hospital entertainment system. Transmission link 6, then, may simply comprise a coaxial or optical fiber cable link between an entertainment control center and a plurality of terminals, for example, terminals 7, 8 or 9 located in rooms of the facility.

In particular, at the system control center, a satellite signal may be received at satellite antenna 2 and then received and decoded at satellite receiver decoder 3 for distribution via modulator 5 over a distribution cable 6 to the interactive terminals 7, 8 or 9 of the pre-sent invention. Additionally, a band of cable television channels received over cable facilities 1 are received and, if necessary, descrambled at cable receiver/descrambler 4. The descrambled video signals are then modulated at modulator 5 for distribution over facilities 6 to interactive terminals 7, 8 or 9. If desired, an optional scrambler may be provided for scrambling premium channel transmissions to interactive terminals 7, 8, or 9. Of course, terminal 7, 8, or 9, then, would comprise descrambler circuitry capable of descrambling the scrambled premium channel transmissions. Such circuitry is not shown in either FIG. 1 or 2 but would be preferable in a system involving distribution of signals to remote subscriber locations.

According to the exemplary embodiment of FIG. 1, the hotel or hospital location may be connected to other hotels or hospitals via data link 14. Over data link 14, data may be received via modem 13 at system manager 12. In this manner, the hotel or hospital system manager may maintain current status of all features and all interactive terminals of an entertainment system comprising a plurality of hotels. For example, entertainment schedules may be distributed over the data transmission link from a network control center where the entertainment schedule is composed. System manager 12 comprises a data processing unit and appropriate memory for storing status and features associated with all terminals in the system. System manager 12 also controls the generation of video channels at modulator 11, if necessary, for transmission over facility 6 to the two-way interactive terminals 7, 8 or 9. In particular, modulator 11 comprises the capability to generate signals for actuating the display of character screens at terminal locations responsive to the control of the system manager 12 in the event, for example, that terminals are unable to generate the character screens themselves.

The generation of complete screens of characters for transmission to a terminal according to the present invention for display is not required because the terminal (FIG. 2) comprises its own character generator 204. Consequently, locally generated video modulator 11 is optional. Instead, system manager 12 generates commands to generate screens, and not the screens themselves, for transmission via addressable transmitter 10 to an interactive terminal according to the present invention. In a "hybrid" system comprising terminals having no character generator and terminals according to the present invention, locally generated video modulator 11 would be necessary. The screens generated either at the terminal or by way of modulator 11, for example, may relate to the provision of information to guests or patients about hotel or hospital services, respectively.

Also according to FIG. 1, system manager 12 controls an addressable transmitter/receiver 10 for transmitting addressed communications which are uniquely addressed to terminals 7, 8 or 9 and receiving communications at random times or in response to polling requests of terminals. The addressable transmitter 10 according to FIG. 1 may transmit addressed information on a separate data carrier, for example, at 108 megahertz and receive information transmitted in a so-called upstream direction from the terminals on another separate data channel at 25 megahertz. In an alternative embodiment, all downstream communications may be transmitted in band or within a particular television channel transmission, for example, within the horizontal or vertical intervals of transmitted video signals. Consequently, the system manager 12 accomplishes in band signaling by controlling data input into the video signals transmitted via either modulators 5 or 11 (not shown). A separate data carrier for each direction of transmission may be preferred due to the increased data carrying capacity. For upstream transmission, a telephone line or spread spectrum transmission may be employed as an alternative to a separate data channel.

Figure 1A:
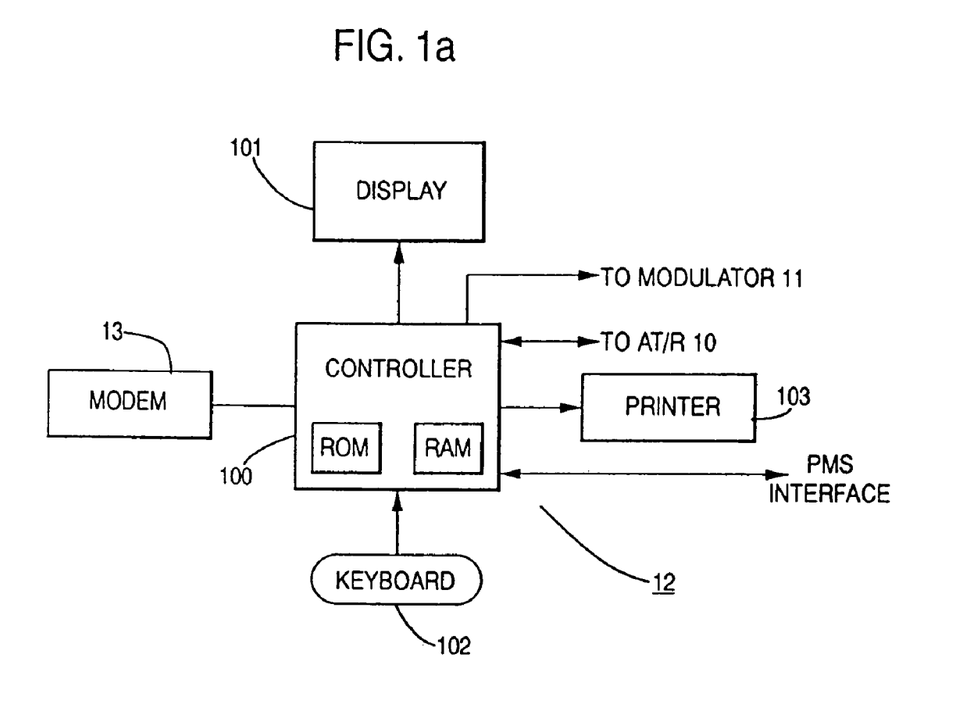
FIG. 1a is a block schematic diagram of system manager 12 of FIG. 1.

Referring to FIG. 1a, system manager 12 particularly comprises a processor 100, an associated memory, ROM, for storing control algorithms, a read/write memory, RAM, for storing a plurality of character screens, a display screen 101 and a keyboard 102 for screen design and modification. An optional printer 103 is also provided for printing out room checkout bills in a similar manner as would occur at a hotel front desk during checkout.

Besides specifically addressed data communications with the interactive terminals 7, 8 or 9, the system manager may also address communications globally to all interactive terminals which communications may or may not require a terminal to respond. Such global communications, for example, may be addressed to a global address representing all terminals in the particular hotel system or to a group address representing a group of terminals within the system having a commonality of interest.

Figure 2:
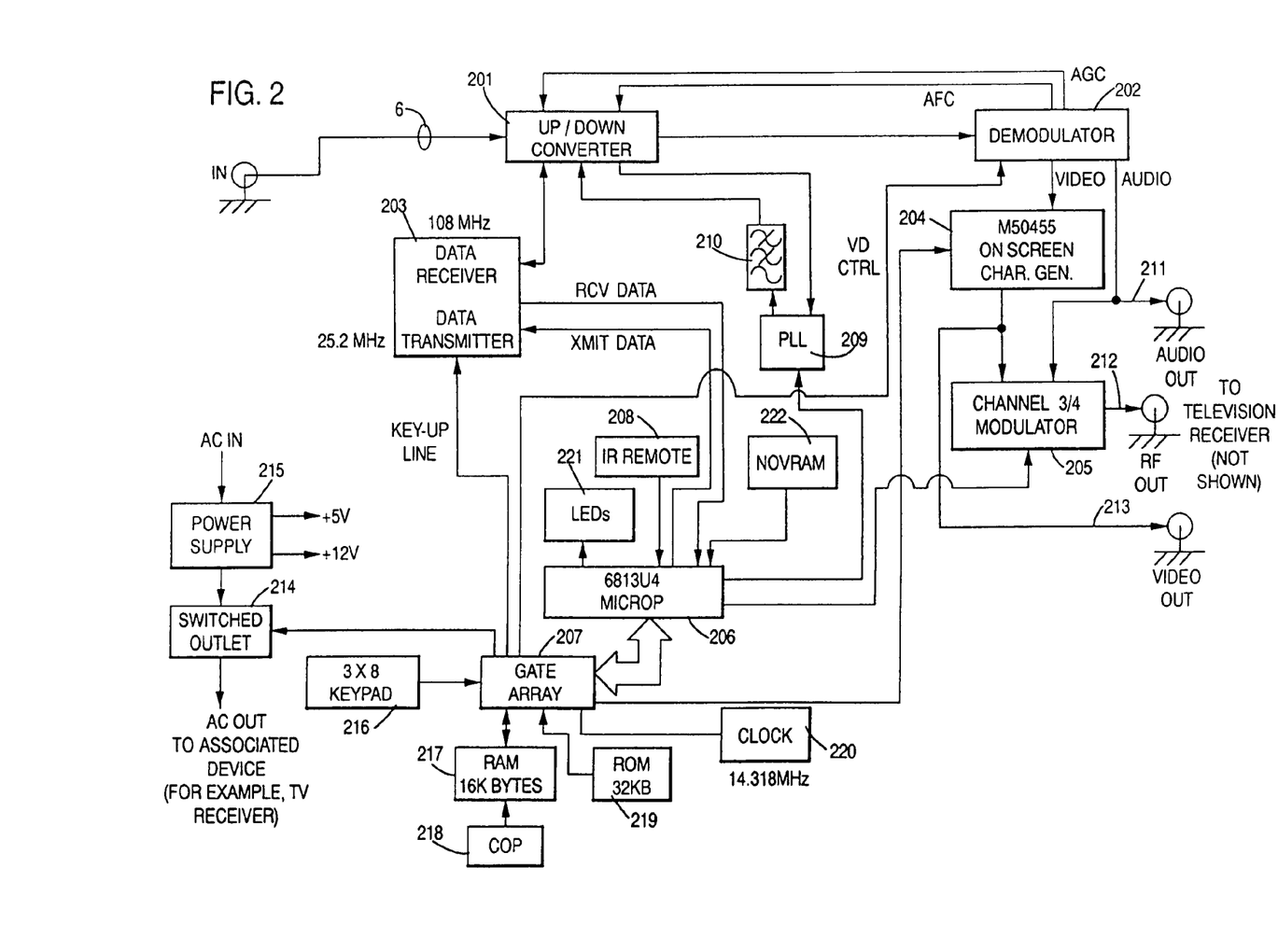
FIG. 2 is a block schematic diagram of a two-way interactive terminal according to the present invention comprising a microprocessor, a memory, a character generator, a key pad and a television signal output to an associated television receiver.

Referring to FIG. 2, there is shown a two-way interactive terminal according to the present invention. The terminal is coupled via facility 6 to video modulator 5, addressable transmitter/receiver 10, and locally generated video modulator 11, if provided, as shown in FIG. 1.

In particular, a two-way interactive terminal according to the present invention comprises an up/down converter 201 for converting channels received over the facility 6 for display at an associated television receiver (not shown) or for transmitting data modulated to 25 megahertz by data transmitter 203 for transmission over facility 6. Up/down converter 201 passes data on the separate data carrier at 108 megahertz for demodulation and reception at data receiver 203. Received television entertainment signals are provided by up/down converter 201 to demodulator 202 which also provides automatic frequency control and gain control of up/down converter 201. Demodulator 202 provides video via on screen character generator 204 to channel ¾ modulator 205. In this manner, on screen character generation may appear superimposed upon an incoming video signal or displayed in the form of a teletext screen, for example, text on a plain colored background. Also at demodulator 202 the baseband audio channel is transmitted to audio output 211 or via channel modulator 205 to the television receiver at radio frequency. In addition, a baseband video output 213 may be provided from on screen character generator 204 at video output jack 213.

The interactive terminal of the present invention further comprises a processor 206 for controlling data transmission and reception at data receiver/transmitter 203. Processor 206 also controls character generation at character generator 204 via gate array 207. Also via gate array 207, the processor 206 controls a key pad 216 which may be directly coupled to the gate array or coupled via infrared or other remote control transmission link receiver 208. Random access memory (RAM) 217, provided with backup power by capacitor 218, stores character screen commands, downloaded feature data and other data received over the data transmission link via data receiver 203 from the system manager responsive to processor 206 control. The processor 206 also has access to a nonvolatile random access memory 222 and access via gate array 207 to an outboard read only memory (ROM) 219. Processor 206 receives remote control key commands from a remote control key pad via infrared or other remote control transmission receiver 208. Processor 206 may also control the operation of a phase lock loop 209 and bandpass filter 210 for controlling operation of the up/down converter 201.

Power is supplied via an alternating current input to power supply 215 which provides, for example, a plus 5 volt and a plus 12 volt DC input to various components of the terminal requiring such power. Furthermore, the alternating current power input to power supply 215 may be provided via a controlled switched outlet 214 to an associated device such as the television receiver associated with the terminal. The state of the switched outlet 214 is controlled via gate array 207 by processor 206. For example, the switched outlet 214 may continuously provide power to its associated device or provide power only when an "on" button of key pad 216 or a remote control key pad is set to an on condition.

Values inside of boxes or associated with boxes are exemplary of memory sizes, clock rates, or component types. For example, clock 220 for clocking the microprocessor operation may operate at 14.318 megahertz. The clock signal is divided down by gate array 207 for operation of the microprocessor 206 which may be a Motorola MC 6803U4 or for clocking other processes of the terminal. The on screen character generator 204, for example, may be a Mitsubishi M50455 component. RAM 217 may comprise 16 kilobytes of memory and ROM 219 may comprise 32 kilobytes of memory.

Figure 3:
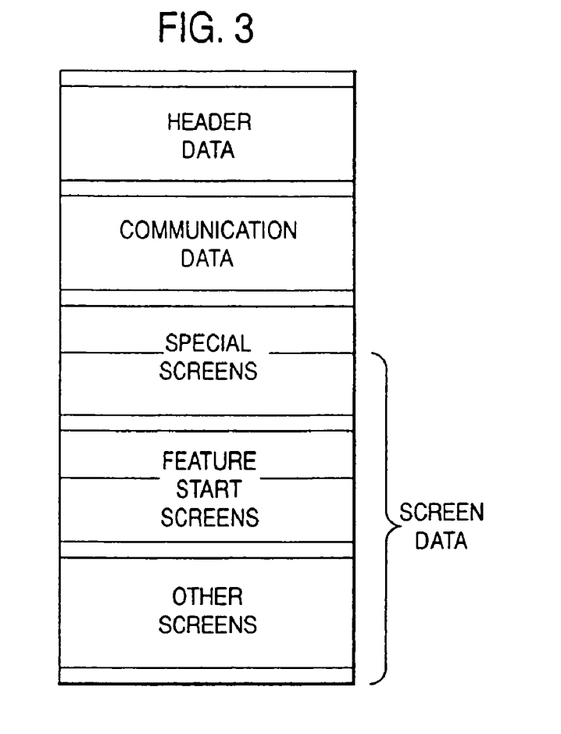
FIG. 3 is a schematic diagram showing the data types stored within the screen data area of RAM 217 of FIG. 2.

Referring now to FIGS. 2-8, the method for controlling storage of screen data in RAM 217 of the interactive terminal will now be described. Referring first to FIGS. 2 and 3, in the preferred embodiment, RAM 217 comprises a screen data area which is divided into a plurality of data blocks. Six data blocks are shown in FIG. 3, however, in the preferred embodiment, RAM 217 is divided into forty seven (47) such blocks. Each data block is comprised of 292 characters, and may contain any one of three types of data, i.e., header data, communications data and screen data. Data in each data block is uniquely identified by a screen number, which is stored at the beginning of the data block, and this screen number also identifies the data "type". In the preferred embodiment, header data have a screen number of 127, screen data have screen numbers in the range of 128-1023, and communications data have screen numbers over 1023.

A Priority List is also stored in RAM 217 and consists of a plurality of pointers to the RAM locations at which the data blocks are stored. These pointers are arranged in order based on the relative priority of data stored within the screen data area, and the Priority List is updated whenever the contents of the screen area are changed. In the preferred embodiment, the Priority List contains forty seven entities which indicate, in priority order, the locations in RAM 217 at which data blocks are stored. Once a data block is stored in RAM 217, its location is never altered, but the data block may be updated with new information or replaced entirely, as will be explained.

Referring again to FIG. 3, each of the data types stored in RAM 217 is assigned a relative priority which is reflected in the organization of the Priority List. Header data is of the highest priority. Next is communications data followed by screen data.

Screen data may be any one of three types—"Special", "Feature Start" and "Other", and is further prioritized according to "type". Screen data is also prioritized within each type according to an assigned priority number in the range from 0 to 7, with 0 being the highest priority and 7 being the lowest priority.

A Special screen is of higher priority than either of the other two screen types, and follows communications data in the priority order. Special screens include, for example, a screen associated with "Power Up", a "Stand By" screen, and various other screens which are critical to the operation of the user terminal.

A Feature Start screen is next in the priority order. The Feature Start screen is the first screen of each feature, e.g., room service, in-room checkout, to be displayed to the user when the feature is selected. A channel map stored in RAM 217 correlates key pad entered channel numbers with either an EIA channel frequency to which the television receiver is to be tuned or with a unique screen number. The channel map thus correlates each of the Feature Start screens with a predetermined user entered channel number so that the Feature Start screen of a particular feature is displayed whenever the user enters the predetermined channel number via key pad 217 (FIG. 2). For example, in FIG. 6, channel 20, entered via key pad 217, is associated with Feature Start screen 490 of the in-room checkout feature. Other channel keyboard entries activate the terminal to tune to an EIA (Electronic Industries Association) channel frequency for receiving a color television signal.

The third screen type is "Other", and "Other" screens rank last in the priority order. These screens are, thus, the first to be analyzed for possible replacement to make room for other screens of higher priority or associated with the feature currently being viewed by the user, as will be explained. Once the "Other" screen area is exhausted, i.e., when no "Other" screen remain in memory which can be removed to make room for incoming screens, the other data types, i.e., Feature Start screens, Special screens, communications data, and header data, are also analyzed in reverse priority order, for possible deletion.

Figure 4:
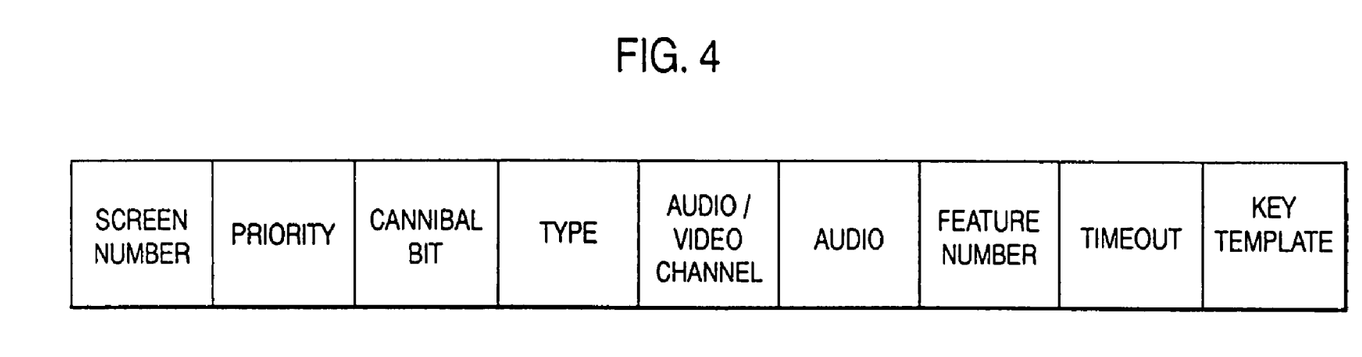
FIG. 4 is a schematic diagram showing the data structure of character screen commands stored in RAM 217 of FIG. 2.

Focusing more specifically on the screen data, the data structure of the character screen commands stored in RAM 217 is shown in FIG. 4. Briefly, as shown in the figure, the screen data consist of a screen number in the range of 128-1023 which is used, as explained above, to uniquely identify the particular screen. Also associated with each screen is a priority number in the range from 0-7, with 0 being the highest priority and 7 being the lowest priority; a cannibal bit, which aids in swapping screen commands in and out of memory, as will be explained; a type field which indicates the screen type, i.e., Special, Feature Start, or Other; a channel number indicating the channel of any background video or audio associated with the screen; an audio field for indicating whether background audio is being used; a feature number field for identifying the feature scenario, i.e., room service, in-room checkout, etc., of which the screen is a part; a time out field for specifying the maximum viewing time of the screen; a key template map for associating a particular key of the key pad with a particular operation to be performed by processor 206; a text field which contains the actual text to be outputted on the television receiver; and an attribute field for defining the screen display characteristics, e.g., the color and intensity of the background, the size of the characters, the character blink rate and the like.

Figure 5:
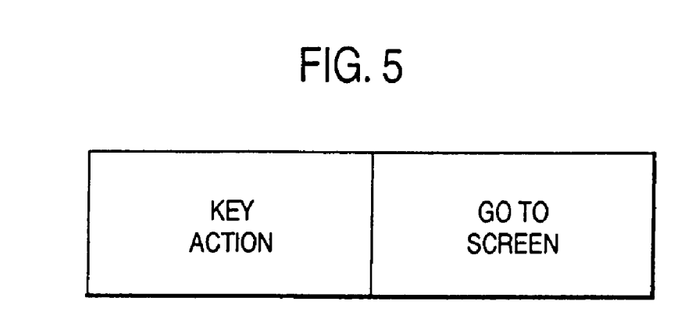
FIG. 5 is a schematic diagram showing the data structure of the key template shown in FIG. 4.

The key template structure is shown in FIG. 5, and specifies for a particular key of the key pad the action to be taken, e.g., prefetch a screen, and/or the screen or channel, i.e., the go-to screen, to be displayed or tuned, respectively at the user terminal when the key is depressed. In the preferred embodiment, key pad 216 is a hand-held battery operated unit and comprises a total of 18 keys which may be programmably defined for each display screen to cause a particular action to be performed and/or to cause a go-to screen to be displayed. The effect of the go-to screen of the key template is to create a decision tree or hierarchical screen structure, in which each character screen command contains one or more pointers from which one or more other screens may be accessed.

Figure 6:
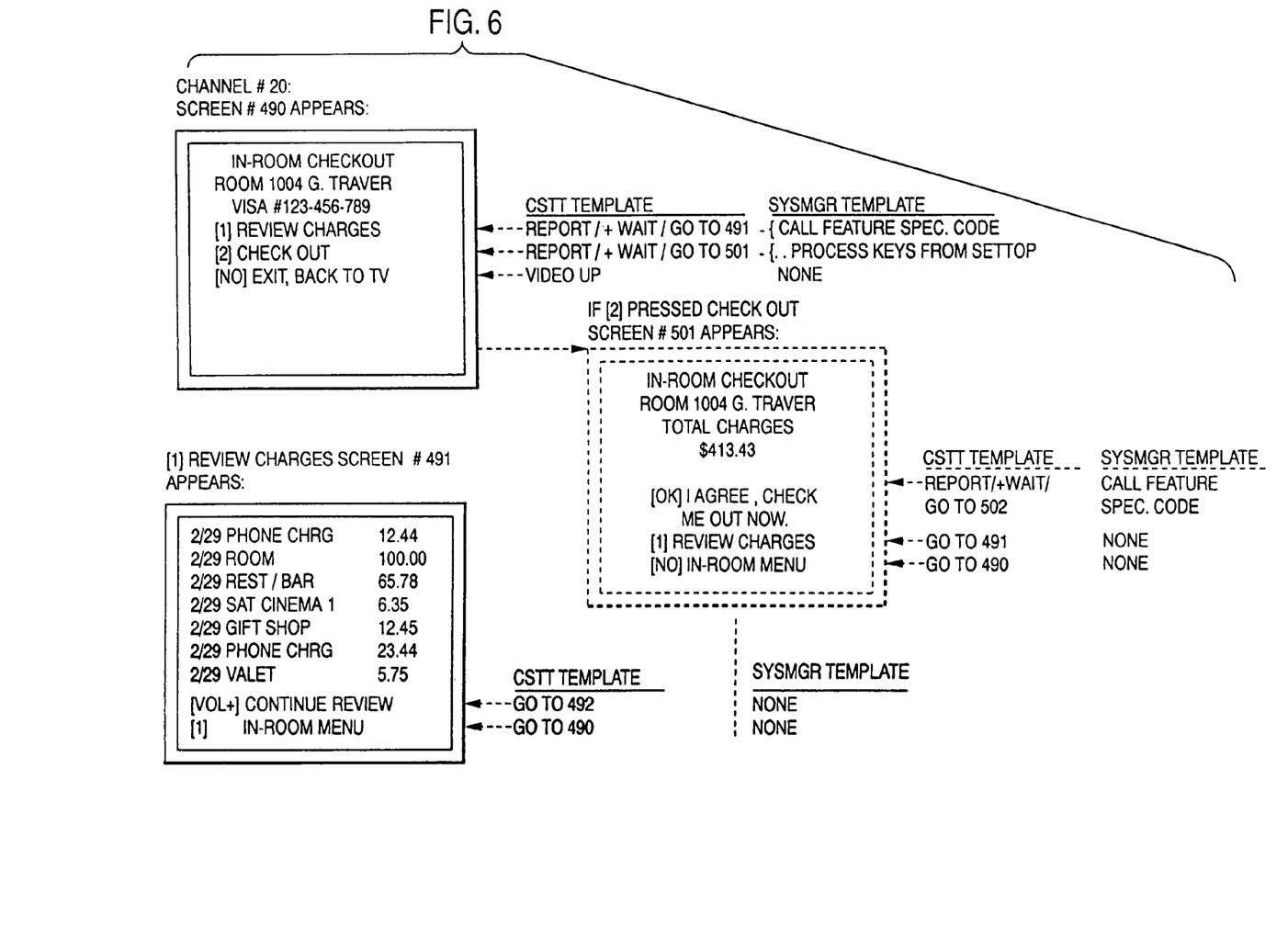
FIG. 6 shows a number of exemplary display screens and associated key templates for the in-room checkout feature.

An example of the key template is shown in FIG. 6 for the in-room checkout feature. As shown in the figure, when the checkout feature is initiated by entering channel 20 on key pad 217, screen 490, which is the Feature Start screen, appears. Screen 490 includes a number of instructions which direct the user to depress the "1" key of key pad 216 to review charges; the "2" key to check out; and the "No" key to exit the feature. A key template is also associated with screen 490, and correlates each of keys 1, 2 and "No", i.e., the expected user responses, with particular actions. Thus, in the example, key 1 causes screen 491 to be displayed; key 2 causes screen 501 to be displayed; and "No" causes the video to be brought up.

In addition to directing action at the user terminal, a key template is also provided, as shown in FIG. 6, to direct certain processing at the system manager location in accordance with the user depressed key. Thus, in the example, depression of key 1 in screen 490 causes the system manager to process the user request and to transfer room charges to the user terminal for display on screen 491. Depression of key 2 causes the system manager to process the total charges for the room, which are displayed on screen 501 and depression of key 3 causes no action at the system manager.

Key templates for the user terminal and system manager are similarly associated with each of the expected key responses of screens 491 and 501, as shown in FIG. 6.

Figure 7A:
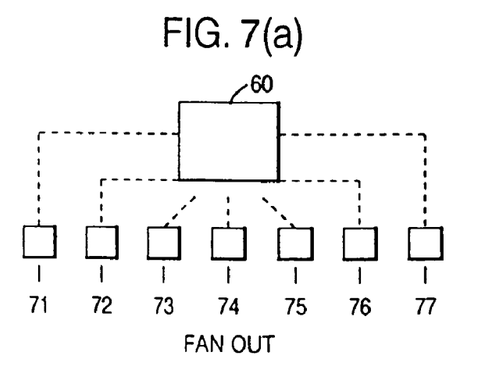
FIG. 7a is a block diagram showing the tree structure of a fan-out type feature.
Figure 7B:
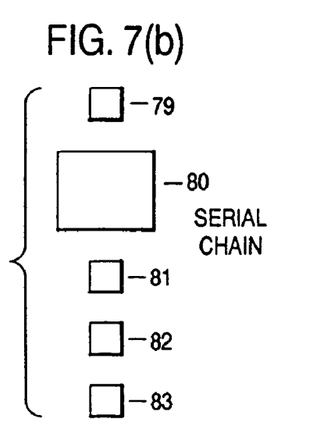
FIG. 7b is a block diagram showing the tree structure of a serial chain type feature.

There are two basic types of features and, thus, two different types of decision tree structures shown in FIGS. 7*a* and 7*b*. In the "fan-out" type feature (FIG. 7*a*), the key templates, associated with the screens of the feature, direct the flow of screens so that one of a number of screens located one level below the current screen in the tree structure is displayed responsive to user selection. Once a screen associated with a particular branch of the tree is selected, other screens associated with unselected branches will not be accessed and can, therefore, be considered for deletion, as will be explained. Thus, for example, as shown in FIG. 7*a*, a user viewing screen 60 may directly access any one of screens 71-77, however, once a particular screen, for example, screen 71, is selected, none of screen 72-77 will thereafter be used. Screens 72-77 can, therefore, be replaced, as needed, by other screens, for example, screens (not shown) following screen 71 in the tree structure, which are likely to be requested by the user.

In contrast to the fan-out feature, in the serial chain type feature (FIG. 7*b*), the key templates of the associated screens direct the flow of screens so that the user either sequentially progresses from one screen to the next in the chain or skips back and forth along the chain. The in-room checkout feature shown in FIG. 6 is an example of a serial chain type feature.

Besides the key template, a cannibal bit, shown in FIG. 4, is also associated with each screen and is used in controlling the storage of screen data in RAM 217. The cannibal bit has a value of either 0 or 1. The normal state of the cannibal bit is 1, but the cannibal bit is configured as 0 in some screen commands to ensure that the screen is retained in memory. This is particularly useful in dealing with features of the serial chain type. As will be explained, when it is desired to store a screen command in RAM 217 and the screen data area is full, processor 206 will first try to remove screens of type "Other" which belong to a feature other than the feature currently selected. However, if only screens of the current feature exist in memory, processor 206 will scan the list of "go-to" screens for the screen currently being viewed and will delete any screen that is not a direct "go-to." This has the effect of deleting screens associated with unselected branches of the decision tree and is effective in fan-out type features to remove unneeded screens. If the current feature is a serial chain type feature, it is desirable to maintain all or most of the screens of the feature in terminal memory. But because many of these screens are not directly accessible, i.e., will not be "go-to's" of other screens, some screens may be deleted. To avoid this situation, the cannibal bit is configured as "0", which signals processor 206, as will be explained, to retain screens of the same feature in terminal memory without regard to the direct "go-to's."

As will be easily understood, the speed at which the system responds to a user request will largely depend upon whether a particular screen is stored locally or whether there is a need to access the central data base at the system manager location. Storage of all screens locally is impractical because this would require too much local storage. However, access is significantly improved by appropriately configuring the local store so that at any given time, the screens most likely to be requested are available in the terminal memory ready for display.

As explained above, when a user desires to activate a particular feature, e.g., in-room checkout, he first enters a predetermined channel number via the terminal keyboard associated with the feature in the channel map. This then causes the first screen of the selected feature to be displayed on the television receiver. The user may then follow the instructions on the screen to proceed through a sequence of screens associated with the selected feature.

In operation, whenever a user initiates a feature or requests a particular service by depressing a key of the key pad, processor 206 first determines whether the requested screen, i.e., either the Feature Start screen or the "go to" screen associated with the depressed key, is present in RAM 217. If it is, then the screen is accessed for display. If the screen is not present in RAM 217, processor 206 issues a screen request to the system manager which responds by issuing an "Add screen" command to processor 206 for the requested screen.

Aside from requesting a screen from the system manager when the processor determines that a screen requested by a user does not currently reside in memory, processor 206 may also prefetch screens into memory prior to their actual use. This prefetch function is tied to user viewing so that when a user views a screen, screens directly accessible by it, as defined by key template go-to's, and not already stored in memory, will be requested. It is also desirable once a user request has been completely serviced and the user is no longer waiting for a screen, e.g., because he is watching television or because he has left the room, to reconfigure terminal memory to an initialized state. Processor 206 will, thus, check a Special screen list maintained in RAM 217 to determine whether there are Special screens which are not already stored in memory, and if there are, these screens will be requested. The channel map will also be searched to identify the screen numbers of all Feature Start screens, a comparison will be made with those screens existent in terminal memory, and any Feature Start screens not present in memory will also be requested.

The basic mechanism for adding screens to RAM 217 is through the "Add screen" command and its companion "Conditional add screen" command. The "Add screen" command is issued by the system manager to processor 206 responsive to a screen request by the user terminal or when the system manager has a new screen to add to the configuration. The "Conditional add" is issued when the system manager wishes to address a screen globally to all of the interactive terminals in the system, and may also be used to address a screen to a particular terminal.

In operation, when the "Add screen" command is issued, processor 206 determines whether vacant space is available in RAM 217 for storing the incoming screen. If space is available, the new screen is stored in the first empty location, and the Priority List is updated so that the memory address of the new screen is appropriately positioned in the list in accordance with the relative priority of the screen. Otherwise, if the RAM is full, it is necessary to remove screen data from RAM 217, and the algorithm described below is used for this purpose.

In general, the removal method will depend upon the current screen i.e., the screen currently being displayed, and the feature with which it is associated. Thus, all "Other" screens, beginning with the screen having the lowest priority as reflected by the Priority List, are first analyzed for possible deletion by checking whether a particular candidate screen is associated with the current feature. Once a screen is found which is not part of the current feature scenario, that screen is replaced by the new screen. If the user is currently watching television, i.e., is not currently requesting any system service, there is no current feature, so that processor 206 will replace the first "Other" screen in the Priority List, i.e., the "Other" screen with the lowest priority, with the new screen.

If the user is currently viewing a screen and all of the "Other" screens in RAM 217 are associated with the current feature, processor 206 examines the cannibal bit of the incoming screen. If the cannibal bit is 1, processor 206 searches the "Other" screens, again beginning with the screen having the lowest priority, to locate screens not directly accessible from the current screen, i.e., screens that are not direct "go-to's" of the current screen. If a non-go-to screen is located, that screen is replaced by the incoming screen.

If all of the "Other" screens are "go-to" screens of the current screen, or if the cannibal bit is 0, processor 206 will then search the "Feature Start" screens and will choose the screen lowest in priority for removal, except that processor 206 will not remove any screen with a 0 priority and also will not remove the "Feature start" screen of the current feature.

If no "Feature start" screen is found which can be removed, a similar search is made of the Special screens, and the Special screen having the lowest priority will be removed. Again, no screens of 0 priority will be removed.

If no suitable screen can be found for removal, another search is performed depending upon whether the incoming screen was requested by the user terminal. This will generally mean that the screen is essential for continued operation. Thus, if the new screen is the result of a screen request, processor 206 will replace the lowest priority screen in memory, disregarding screens with a 0 priority, with the new screen.

The other mechanism for adding screens to RAM 217 is the "Conditional add screen" command which allows the system manager to address a screen globally to all of the interactive terminals in the system or to a particular terminal. The add command is "conditional" in that each terminal determines whether or not it will accept the new screen and, if the screen is accepted, will make room for the screen in accordance with the algorithm described above.

In determining whether a particular screen will be accepted, processor 206 first determines whether the screen corresponds to, i.e., has a same screen number as, a screen currently residing in memory. If it does, then the old screen is replaced with the new screen data.

If the user is watching television, i.e., is not requesting a system service, at the time the "Conditional add" command is issued, processor 206 will also accept and store all "Feature start" screens and all "Special" screens. This ensures that those screens critical to system operation as well as those screens likely to be needed and requested first are available for immediate display.

If, on the other hand, the user is viewing a screen at the time the "Conditional add" command is issued, the criteria for accepting the incoming screen are different. In particular, if the terminal is currently waiting for this particular screen, the screen will be accepted. Otherwise, "Special" screens and "Feature start" screens with a priority of 0 will be accepted, and "Other" screens will be accepted only if the new screen has the same feature number as the screen currently being viewed and is either a direct "go-to" of the current screen or has a cannibal bit of 0.

This invention has been described in detail in connection with the preferred embodiment. However, it will be easily understood by those skilled in the art that other variations and modifications can be made within the scope of the invention as defined by the appended claims.

The invention claimed is:

1. A method for use in an interactive television system, the interactive television system including a system manager coupled to a plurality of subscriber terminals, comprising the steps of:

receiving a first user input at a subscriber terminal indicating a choice for one of a video signal and first operation data, wherein the first operation data includes a plurality of screens;

generating a screen of first operation data responsive to a command, wherein the screen of operation data is generated by a local screen character generator;

saving a screen of the plurality of screens to memory;

determining whether the screen of the plurality of screens saved into memory is directly accessible or accessible only through other screens;

if the screen of the plurality of screens saved into memory is only accessible through other screens, indicating that the screen of the plurality of screens saved into memory is not to be deleted from memory; and displaying at least one of the video signal and the screen of the first operation data according to the user input, wherein the first operation data is stored in at least one of a screen generator coupled to the system manager and subscriber terminal memory.

2. The method of claim 1, wherein the plurality of screens includes a feature start screen and associated screens, wherein upon receiving user input indicating the first operation data and displaying the feature start screen, the subscriber terminal retrieves the associated screens from the system manager and stores the associated screens in the subscriber terminal memory prior to their actual use.

3. The method of claim 1, the steps further comprising:

receiving a second user input for one of the associated screens according to a channel map associated with the first operation data;

transmitting the second user input to the system manager;

receiving information from the system manager for updating the associated screen; and displaying the associated screen including the updated information in accordance with the second user input.

4. The method of claim 1, wherein a user continues, via user inputs, an interactive communication with the system manager through the plurality of screens associated with the first operation data where the system manager updates each of the plurality of screens.

5. A local environment for providing interactive communications, the local environment comprising:

a system manager for storing information regarding a plurality of clients, each client associated with a terminal located in the local environment;

a local screen generator for generating a screen of information responsive to receiving a command;

memory for saving the screen of information; and a plurality of terminals coupled to the system manager, each terminal for receiving at least one of a video signal and first operation data, wherein when the first operation data is chosen, the terminal displays a feature start screen and the video signal and stores a plurality of screens associated with the first operation data;

wherein the system manager is configured to save the screen into memory and to determine whether the screen of information is directly accessible or accessible only through other screens; and wherein the system manager is further configured to indicate that the screen of information saved into memory is not to be deleted from memory if the screen of information saved into memory is only accessible through other screens.

6. The local environment of claim 5, wherein, upon client input, the terminal requests information from the system manager and subsequently displays the received information associated with one of the plurality of screens.

7. A method of providing services to a patron of a subscriber of an interactive entertainment system, the method comprising the steps of:

generating at the premises of a subscriber a screen of a menu for selecting services, wherein the screen is one of a plurality of screens included in the menu, and wherein the services for selection are offered by at least one of the group consisting of an interactive entertainment system and a subscriber of the interactive entertainment system;

providing a terminal, the terminal adapted to receiver input from a guest and adapted to provide the screen to a display device;

instructing the terminal to save the screen of the plurality of screens to memory;

determining whether the screen of the plurality of screens saved into memory is directly accessible or accessible only through other screens;

if the screen of the plurality of screens saved into memory is only accessible through other screens, instructing the terminal to indicate that the screen of the plurality of screens saved into memory is not to be deleted from memory; and receiving a selection from a guest.

8. The method of claim 7, wherein the screen includes charges owed by the guest.

9. The method of claim 8, wherein charges include charges for services offered by the interactive entertainment system.

10. The method of claim 8, wherein the subscriber provides room service to guests, and the charges include charges for room services.

11. The method of claim 7, wherein the screen is a check-out screen that enables the guest to check-out from the premises of the subscriber using the terminal.

12. The method of claim 7, further including the steps of:

providing a system manager, the system manager located at the premises of the subscriber and adapted to control billing of the guest; and transmitting the screen downstream through a local area network to the terminal.

13. The method of claim 7, wherein the screen is generated at the terminal.

14. The method of claim 7, further including the steps of:

associating a given screen of the menu with a given television channel; and outputting the given screen from the terminal such that the screen is displayable on a television tuned to the given television channel.

15. The method of claim 14, wherein the screen is for room-service.

16. The method of claim 14, wherein the screen is a for in-room checkout.

17. The method of claim 14, wherein the screen is for providing information about services offered by the subscriber.

18. The method of claim 14, wherein the given screen is a first screen in a sequence of screens for a service, and further including the steps of:

providing in the given screen instructions for the guest; and receiving input from the guest;

responsive to receiving the input from the guest, determining whether a second screen in the sequence of screens is stored in the terminal;

responsive to determining the second screen is not stored in the terminal, requesting the second screen from a system manager that is located in the premises of the subscriber;

responsive to requesting the second screen, receiving the second screen from the system manager; and outputting the second screen from the terminal such that the second screen is displayable on a television.

19. The method of claim 18, further including the step of:

responsive to determining the second screen is not stored in the terminal, prefetching a third screen from the system manager, wherein the third screen is one of the screens in the sequence of screens.

20. The method of claim 7, further including the steps of:

receiving a video signal;

outputting the video signal such that the video signal is displayable on a television;

outputting the screen such that the screen is displayable on a television, wherein the screen appears superimposed upon the image created by the video signal.

21. A system for providing services to guests of a subscriber of an interactive entertainment system, the system comprising:

means for receiving content provided by the interactive entertainment system;

means for distributing the received content to terminals located at the premises of the subscriber;

means for generating screens of a menu for selecting services, wherein the menu includes a plurality of screens, and the services offered in the menu include services of the interactive entertainment system and services of the subscriber, wherein the screen generating means is located at the premises of the subscriber; and means for instructing the screen generating means to save a screen of the plurality of screens to memory;

means for determining whether the screen of the plurality of screens saved into memory is directly accessible or accessible only through other screens;

means for instructing the terminal such that, if the screen of the plurality of screens saved into memory is only accessible through other screens, the terminal indicates that the screen of the plurality of screens saved into memory is not to be deleted from memory;

means for receiving a request for a service by a guest; and means for managing the system, the managing means including means for billing the guest for selected services.

22. The system of claim 21, wherein the request receiving means is a terminal, the terminal including the screen generator means.

23. The system of claim 22, wherein responsive to receiving the request from the guest, the screen generator means generates a screen of the menu using data stored in a memory of the terminal, the terminal outputs the screen such that the screen is displayable on a television.

24. The system of claim 22, wherein responsive to receiving the request from the guest, the terminal determines whether the memory includes data for the screen, and responsive to determining the memory does not include the data, the terminal sends a screen request to the system manager.

25. The system of claim 21, wherein the screen generator means generates a room-service screen that enables the guest to order room-service from the subscriber.

26. The system of claim 21, wherein the screen generator means generates a room check-out screen that enables the guest to check-out from the premises of the subscriber.

27. A method of providing services to guests of a subscriber of an interactive entertainment system, the method comprising the steps of:

providing a plurality of two-way terminals;

generating at the premises of a subscriber a screen for display on a television, wherein the screen relates to information about services provided by the subscriber of the interactive entertainment system;

saving the screen to memory on one of the plurality of two-way terminals;

determining whether the screen saved into memory is directly accessible or accessible only through other screens;

if the screen saved into memory is only accessible through other screens, indicating that the screen of a plurality of screens saved into memory is not to be deleted from memory; and receiving a selection from a guest.

28. A system for providing services to guests of a subscriber of an interactive entertainment system, the system comprising:

means for receiving content provided by the interactive entertainment system;

means for distributing the received content to terminals located at the premises of the subscriber;

means for generating screens of information related to services provided by the subscriber of the interactive entertainment system;

means for saving the screens to memory on a terminal located at the premises of a subscriber;

means for determining whether the screen saved into memory is directly accessible or accessible only through other screens;

means for indicating that, if the screen saved into memory is only accessible through other screens, the screen saved into memory is not to be deleted from memory; and means for receiving a request for a service by a guest.

* * * * *